(12) United States Patent
Nagayama

(10) Patent No.: US 11,888,275 B2
(45) Date of Patent: Jan. 30, 2024

(54) CONNECTOR AND HOLDING STRUCTURE OF ELECTRIC WIRE WITH TERMINAL

(71) Applicant: YAZAKI CORPORATION, Tokyo (JP)

(72) Inventor: Masataka Nagayama, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 106 days.

(21) Appl. No.: 17/720,307

(22) Filed: Apr. 14, 2022

(65) Prior Publication Data

US 2022/0336970 A1 Oct. 20, 2022

(30) Foreign Application Priority Data

Apr. 14, 2021 (JP) .................... 2021-068504

(51) Int. Cl.

| | |
|---|---|
| *H01R 4/34* | (2006.01) |
| *H01R 13/50* | (2006.01) |
| *H01R 11/12* | (2006.01) |
| *H01R 13/52* | (2006.01) |
| *H01R 13/74* | (2006.01) |
| *H02G 3/02* | (2006.01) |

(52) U.S. Cl.
CPC ............... *H01R 4/34* (2013.01); *H01R 13/50* (2013.01); *H01R 11/12* (2013.01); *H01R 13/5202* (2013.01); *H01R 13/74* (2013.01); *H02G 3/02* (2013.01)

(58) Field of Classification Search
CPC .......... H01R 4/34; H01R 13/50; H01R 11/12; H01R 13/5202; H01R 13/74; H01R 11/05; H01R 2201/26; H01R 13/631; H01R 13/5205; H01R 13/6215; H02G 3/02

See application file for complete search history.

(56) References Cited

U.S. PATENT DOCUMENTS

| | | | |
|---|---|---|---|
| 9,287,639 B2 * | 3/2016 | Kaneko .................... | H01R 4/34 |
| 10,686,261 B2 * | 6/2020 | Matsuura ................ | H02G 3/16 |
| 2016/0172781 A1 | 6/2016 | Nunner et al. | |
| 2018/0269624 A1 | 9/2018 | Iwabe et al. | |

FOREIGN PATENT DOCUMENTS

| | | |
|---|---|---|
| EP | 3783748 A1 | 2/2021 |
| JP | H11-3735 A | 1/1999 |
| JP | 2003-317821 A | 11/2003 |
| JP | 2006-196349 A | 7/2006 |
| JP | 2007-141725 A | 6/2007 |
| JP | 2013-157256 A | 8/2013 |
| WO | 2008/134992 A1 | 11/2008 |

\* cited by examiner

*Primary Examiner* — Briggitte R. Hammond
(74) *Attorney, Agent, or Firm* — KENEALY VAIDYA LLP

(57) ABSTRACT

A connector includes a housing to be assembled to a wall portion of a box-shaped body, a bus bar having a fastened portion disposed inside the wall portion and is to be connected to a terminal fitting by fastening using a bolt, and a nut held by the housing with a gap between the nut and the fastened portion into which the terminal fitting is capable of being inserted and engaged with the bolt to fasten the fastened portion and the terminal fitting inserted into the gap together.

5 Claims, 12 Drawing Sheets

CONNECTOR AND HOLDING STRUCTURE OF ELECTRIC WIRE WITH TERMINAL

CROSS-REFERENCE TO RELATED APPLICATIONS

This application is based on and claims priority under 35 USC 119 from Japanese Patent Application No. 2021-068504 filed on Apr. 14, 2021, the contents of which are incorporated herein by reference.

TECHNICAL FIELD

The present invention relates to a connector and a holding structure of an electric wire with a terminal.

BACKGROUND ART

In the related art, there has been proposed a connector that is attached to an outer wall of a box-shaped body in which a liquid such as lubricating oil is sealed, such as a transmission (for example, a CVT) for a vehicle or a motor, and that electrically connects devices and the like disposed inside and outside the outer wall. This type of connector is also called a relay connector, and is typically assembled to the outer wall of the box-shaped body by being inserted into a hole provided in the outer wall (see, for example, Patent Literature 1).

CITATION LIST

Patent Literature

Patent Literature 1: JP-2013-157256-A

Incidentally, when an electric wire extending from a device (for example, an oil pump) disposed inside the above-described box-shaped body is connected to a connector assembled to the box-shaped body, since an internal space of the box-shaped body is limited, a terminal fitting of the electric wire is fixed to a bus bar of the connector while the electric wire extending from the device is largely curved (that is, in a state in which the electric wire is bent with a small radius of curvature). In this case, since a connection work is performed in the narrow internal space while resisting an elastic force generated by the curved electric wire, it is difficult to improve workability of the connection work. In particular, when a terminal-equipped electric wire having a large diameter (a so-called thick electric wire) is used or when a degree of curvature of the electric wire is large, the elastic force generated by the electric wire is also large, and thus it is further difficult to perform the connection work inside the box-shaped body.

SUMMARY OF INVENTION

An object of the present invention is to provide a connector and a holding structure of terminal-equipped electric wire using the connector capable of improving workability of a work of connecting a terminal-equipped electric wire to the connector.

In order to achieve the above object, a connector and a holding structure of a terminal-equipped electric wire according to the present invention are characterized as follows.

A connector of the present invention includes a housing to be assembled to a wall portion of a box-shaped body that is an attachment target; a bus bar that is to be held by the housing and including a body portion extending so as to penetrate the wall portion, and a fastened portion disposed on an inner side of the box-shaped body with respect to the wall portion and connected to a terminal fitting by fastening using a bolt; and a nut that is to be held by the housing with a gap between the nut and the fastened portion, the gap allowing insertion of the terminal fitting, and that is to engage with the bolt to fasten the fastened portion and the terminal fitting inserted into the gap together.

Further, details of the present invention will be clarified by reading an aspect (hereinafter, referred to as an "embodiment") for implementing the invention to be described below with reference to the accompanying drawings.

BRIEF DESCRIPTION OF DRAWINGS

FIG. 4A is a perspective view thereof, FIG. 4B is a side view thereof, and FIG. 4C is a front view thereof.

FIG. 6A is a side view showing a state before the assembling, FIG. 6B is a side view showing a state after the assembling, and FIG. 6C is a front view showing a state after the assembling.

DESCRIPTION OF EMBODIMENTS

Embodiment

Hereinafter, a connector 1 according to an embodiment of the present invention and a holding structure of terminal-equipped electric wire including the connector 1 and a terminal-equipped electric wire 8 will be described with reference to the drawings.

Figure 1:
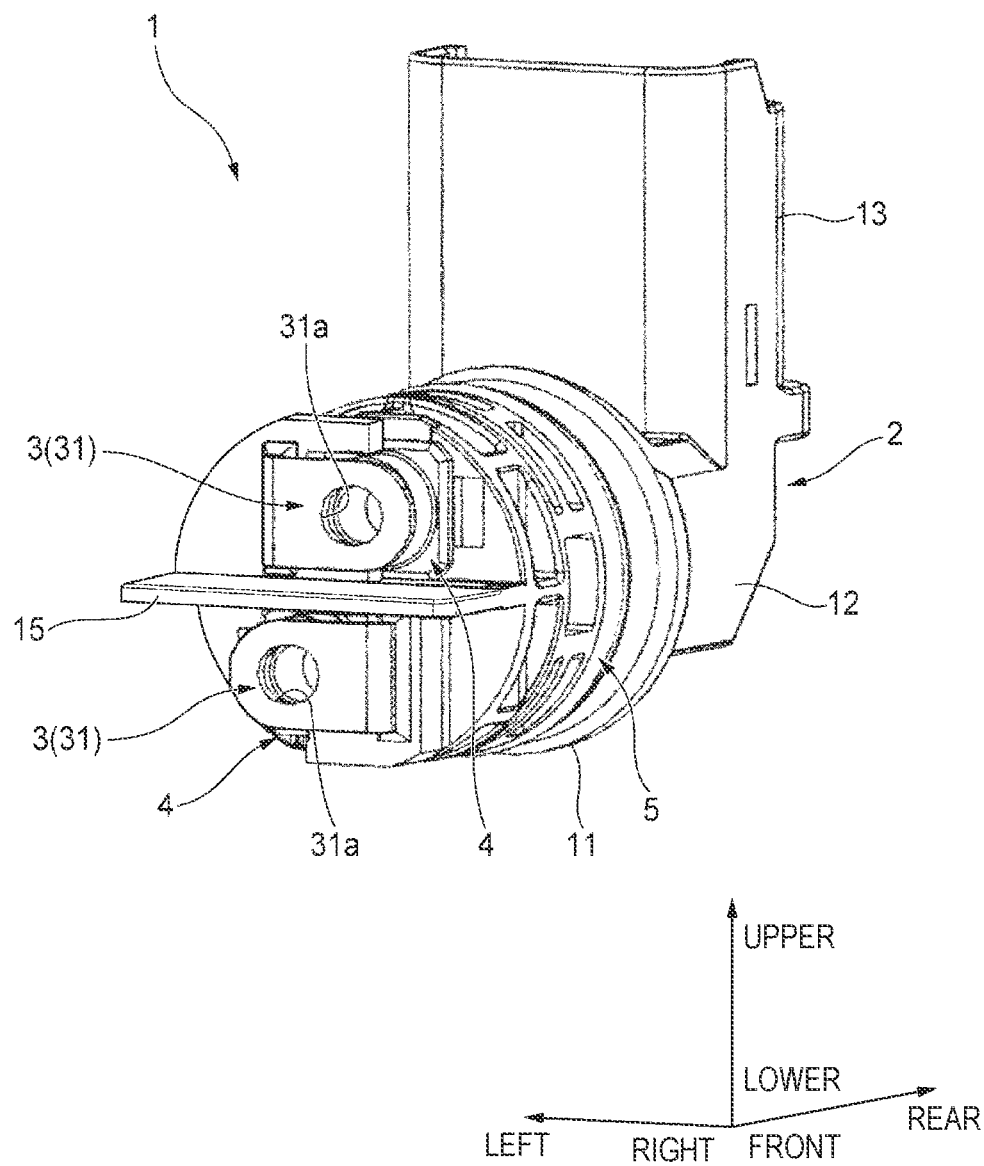
FIG. 1 is a perspective view showing a connector according to an embodiment of the present invention.
Figure 6A:
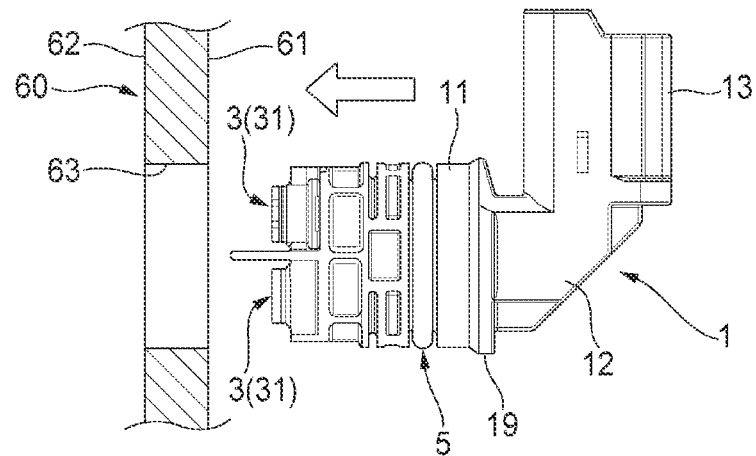
FIGS. 6A to 6C are views showing a procedure for assembling the connector to an outer wall of a case.
Figure 6B:
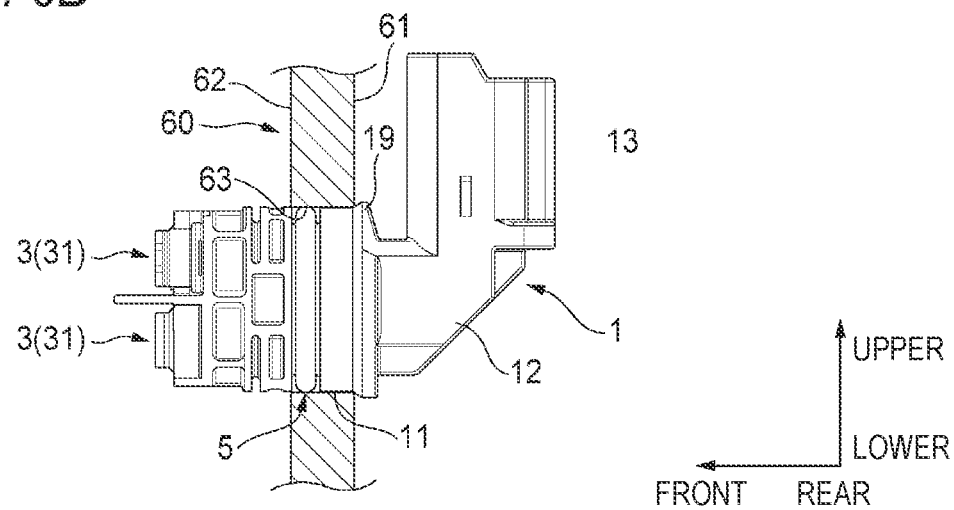
Figure 6C:
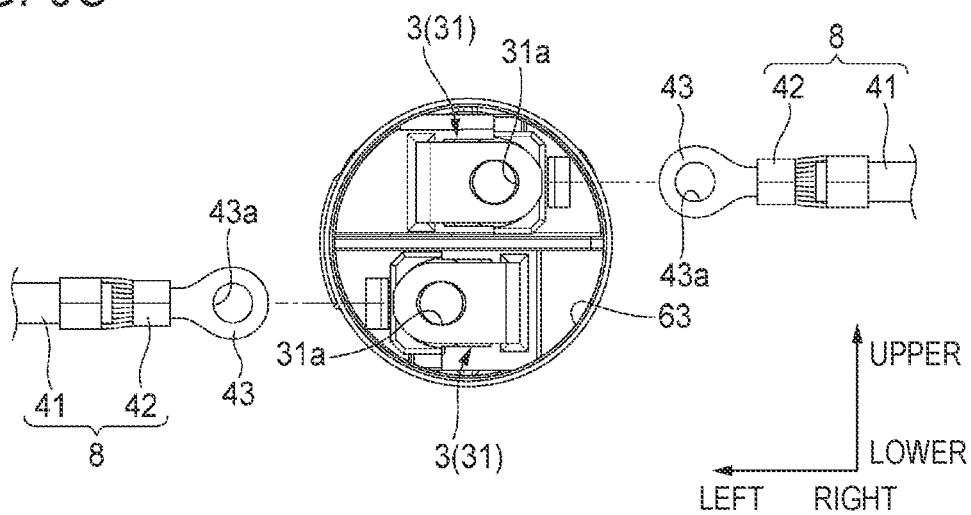

As shown in FIGS. 6A to 6C, the connector 1 shown in FIG. 1 is typically used in a state in which the connector 1 is attached to an outer wall 60 of a case (box-shaped body) such as a vehicle transmission (for example, a CVT), a distal end side portion of a main body portion 11 is exposed to oil (hydraulic oil or the like) in the case, and a connecting portion 12 and a connector portion 13 are exposed to air or water. An outer surface 61 of the outer wall 60 is exposed to air or water outside the case, and an inner surface 62 of the outer wall 60 is exposed to the oil stored in the case. The connector 1 functions as a relay connector that electrically connects a pair of terminal-equipped electric wires 8 (see FIG. 6C and the like) to be connected to fastened portions 31 of a pair of bus bars 3 exposed from a distal end surface of the main body portion 11 and a counterpart connector (not shown) to be fitted to the connector portion 13.

Hereinafter, for convenience of description, as shown in FIG. 1 and the like, a "front-rear direction", a "left-right direction", an "up-down direction", "front", "rear", "left", "right", "upper", and "lower" are defined. The "front-rear direction", the "left-right direction", and the "up-down direction" are orthogonal to one another. The up-down direction coincides with a fitting direction of the connector portion 13 and the counterpart connector. The left-right direction coincides with an extending direction of the pair of terminal-equipped electric wires 8 connected to the fastened portions 31 of the pair of bus bars 3 (see FIG. 6C).

As shown in FIG. 6C, the terminal-equipped electric wire 8 is configured by attaching a terminal fitting 42 to one end portion of an electric wire 41. The other end portion of the electric wire 41 is connected to a device (for example, an oil pump or the like and not shown) disposed inside the case. The metal terminal fitting 42 is a round terminal (so-called LA terminal) including a circular flat plate portion 43 in which a bolt through hole 43a is formed.

As shown in FIGS. 1 to 3, the connector 1 includes a housing 2 and the pair of bus bars 3 insert-molded and held in the housing 2. Hereinafter, each member constituting the connector 1 will be described in order.

Figure 2A:
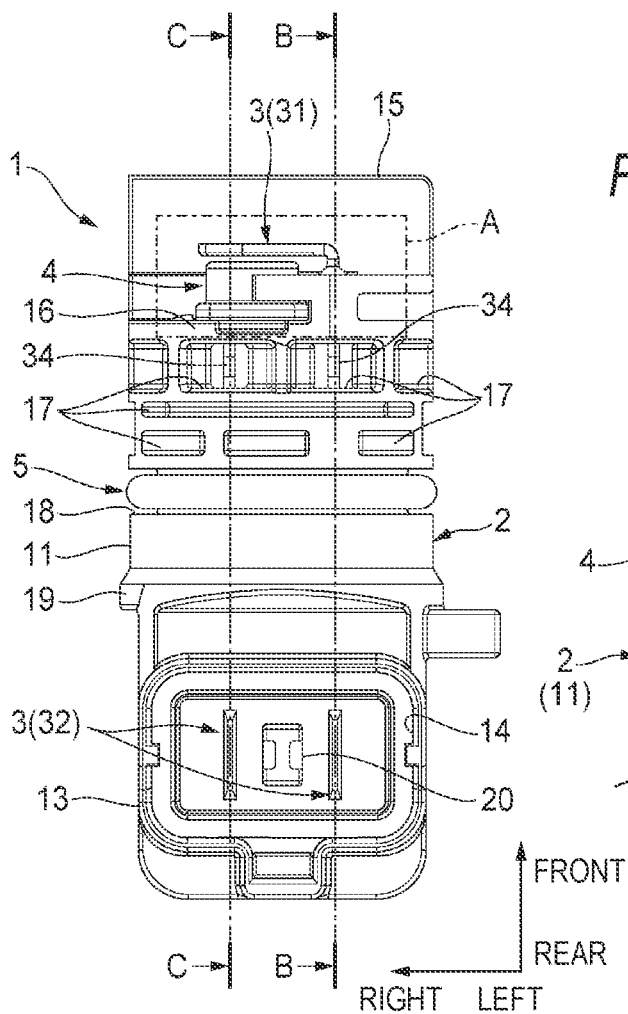
FIG. 2A is a top view of the connector shown in FIG. 1.

First, the housing 2 will be described. The housing 2 is a resin molded product, and as shown in FIGS. 1 to 3, integrally includes the main body portion 11, the connecting portion 12 extending rearward from a rear end portion of the main body portion 11, and the connector portion 13 protruding upward from a rear end portion of the connecting portion 12. As shown in FIGS. 3A and 3B, a lower face of the connecting portion 12 extends in an oblique direction from a lower front side toward an upper rear side. The housing 2 has a substantially L shape when viewed in the left-right direction.

As shown in FIGS. 1 to 3, the main body portion 11 has a substantially cylindrical shape extending in the front-rear direction. An outer diameter of the main body portion 11 (excluding an O-ring 5 and an annular protruding portion 19) is slightly smaller than an inner diameter of an attachment hole 63 of the outer wall 60 in order to be inserted into the attachment hole 63. Outer diameters of the O-ring 5 and the annular protruding portion 19 are larger than the inner diameter of the attachment hole 63. As shown in FIGS. 3A and 3B, substantially entire portions of the pair of bus bars 3 extending in the front-rear direction are embedded in the main body portion 11 and the connecting portion 12 by insert molding. The fastened portions 31 of the pair of bus bars 3 are exposed from a front end surface of the main body portion 11 so as to be disposed side by side at an interval in the up-down direction (see FIG. 1 and the like).

As shown in FIG. 1 and FIGS. 3A and 3B, the connector portion 13 has a substantially rectangular tubular shape extending in the up-down direction and extending in the left-right direction. As shown in FIGS. 3A and 3B, a substantially rectangular fitting recessed portion 14 recessed downward is formed inside the connector portion 13. A bottom surface of the fitting recessed portion 14 is formed by a part of an upper end surface of the connecting portion 12. Exposed portions 32, which will be described later, of the pair of bus bars 3 are exposed inside the fitting recessed portion 14 so as to be disposed side by side at an interval in the left-right direction (see also FIG. 2A). The counterpart connector described above is fitted into the fitting recessed portion 14. When the counterpart connector is fitted into the fitting recessed portion 14, the pair of exposed portions 32 are connected to a pair of terminals (not shown) accommodated in the counterpart connector. A guide projection 20 for guiding the counterpart connector at a time of fitting is provided between the pair of exposed portions 32 so as to extend in the up-down direction.

On the front end surface of the main body portion 11, a rectangular flat plate-shaped partition wall 15 protruding forward and extending in the left-right direction is integrally formed so as to partition the pair of fastened portions 31 in the up-down direction (see FIGS. 1, 3A, 3B, and the like). As shown in FIGS. 2A to 2C and 3A and 3B, nut holding portions 16 are formed on the front end surface of the main body portion 11 at an upper side and a lower side of the partition wall 15, respectively, so as to correspond to the pair of fastened portions 31. A metal nut 4 is fixed to each of the nut holding portions 16 so as to be non-rotatable and slightly movable in the front-rear direction.

In a state in which the connector 1 is assembled to the case (see FIG. 6B), the front end surface (that is, the pair of fastened portions 31) of the main body portion 11 is exposed to the oil stored in the case. By providing the partition wall 15, it is possible to increase an insulation distance (in particular, a creepage distance) between the fastened portion 31 of the upper bus bar 3 and the fastened portion 31 of the lower bus bar 3. Accordingly, even when conductive fine particles (for example, so-called contamination such as abrasion powder of gears) are contained in the oil, unintended conduction between the pair of bus bars 3 can be prevented.

Figure 2B:
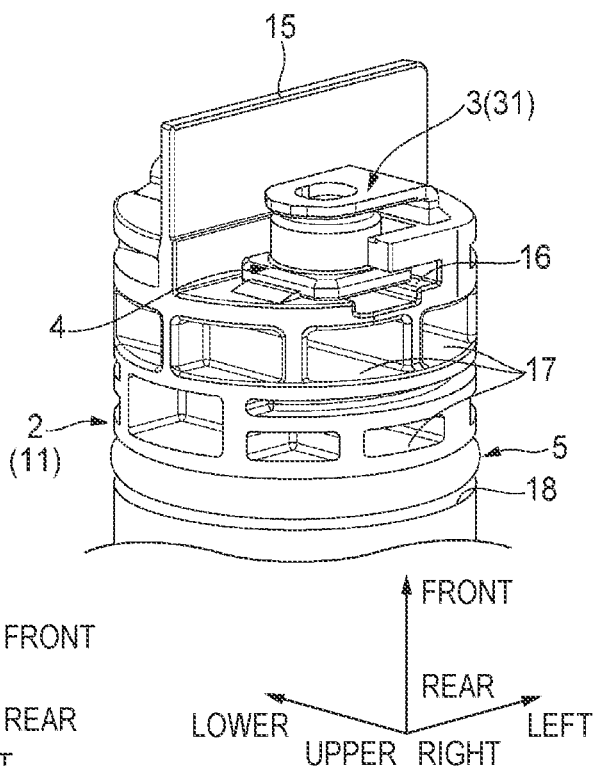
FIG. 2B is a perspective view showing a part of the connector shown in FIG. 1.
Figure 2C:
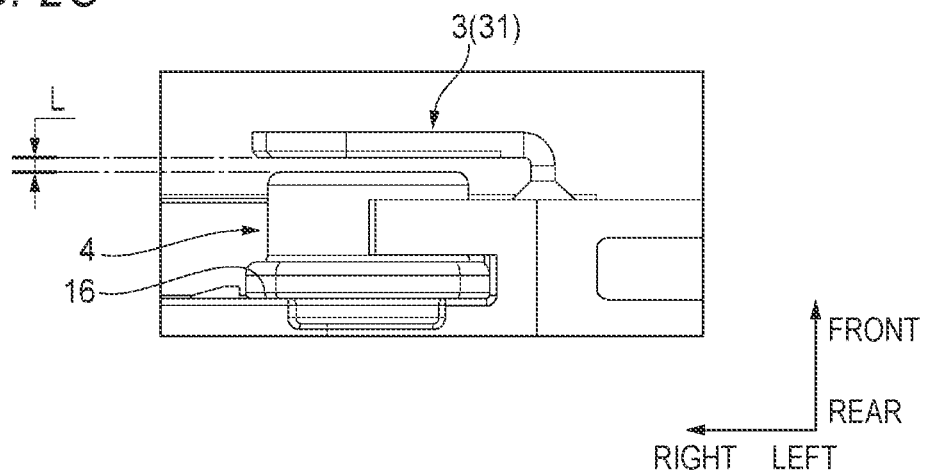
FIG. 2C is an enlarged view of a portion A of FIG. 2A.
Figure 3A:
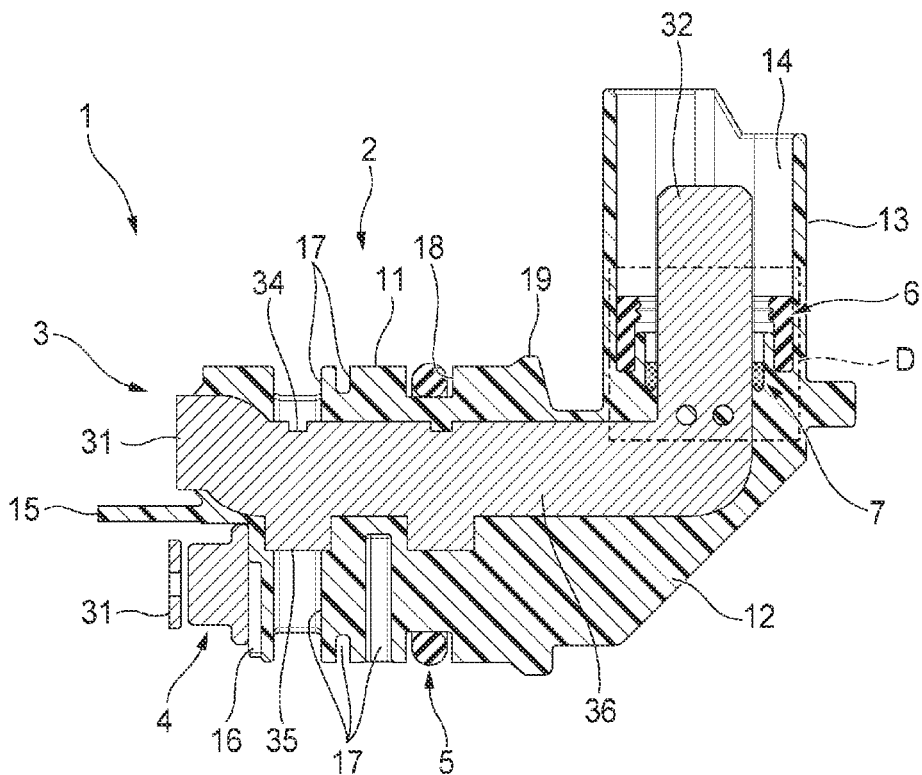
FIG. 3A is a cross-sectional view taken along a line B-B of FIG. 2A.
Figure 3B:
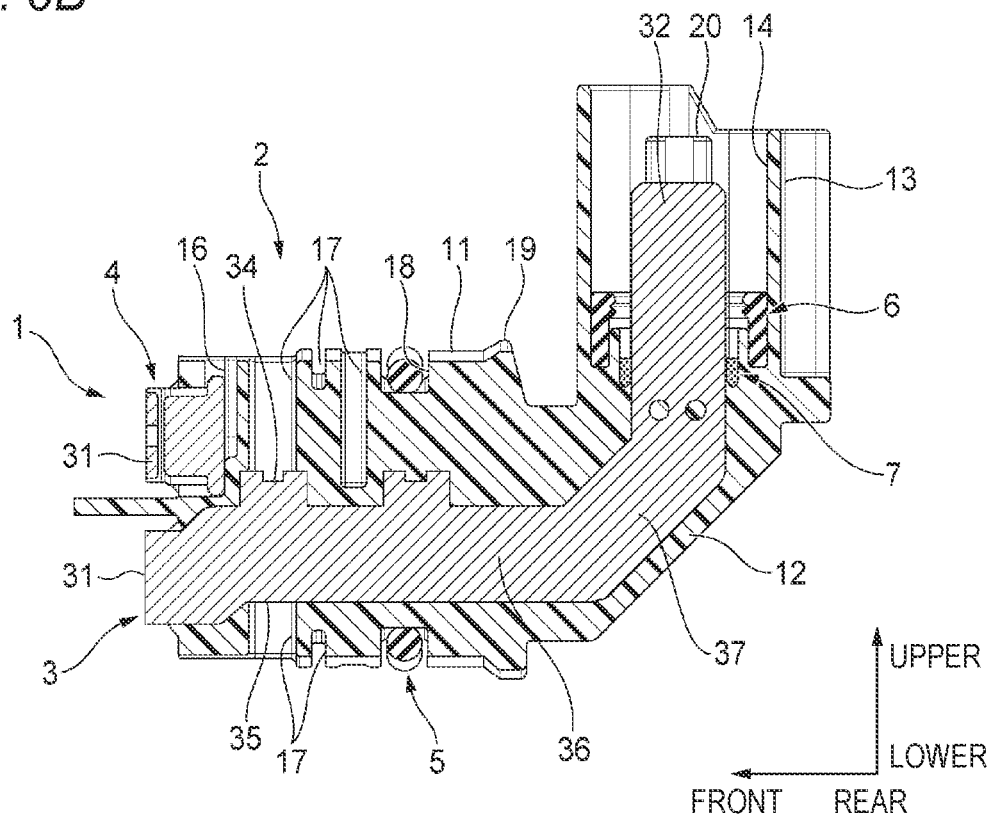
FIG. 3B is a cross-sectional view taken along a line C-C of FIG. 2A.

As shown in FIGS. 2B, 3A, 3B, and the like, a plurality of lightening grooves 17 are formed in a cylindrical outer peripheral surface of a front portion of the main body portion 11. The lightening grooves 17 are formed to reduce a thickness of the main body portion 11 of the housing 2 and to prevent a depression (so-called sinkage) or the like caused by molding shrinkage at a time of molding the housing 2 from occurring. In the present example, each of the lightening grooves 17 has a shape that is recessed inward in a radial direction of the main body portion 11 and extends in a circumferential direction of the main body portion 11. By reducing the thickness of the main body portion 11 by the plurality of lightening grooves 17, a variation in a dimension of the main body portion 11 itself due to the molding shrinkage of a resin constituting the main body portion 11 can be reduced, a positional accuracy of the bus bar 3 is improved, and a dimensional accuracy of a gap L (see FIG. 2C) to be described later between the fastened portion 31 and the nut 4 can be improved. In other words, the gap L can be prevented from being excessively large or excessively small.

As shown in FIGS. 3A, 3B, and the like, an annular recessed portion 18 is formed on a cylindrical outer peripheral surface of a rear portion of the main body portion 11. The rubber O-ring 5 is fitted into the annular recessed portion 18. The annular protruding portion 19 is formed at the rear end portion of the cylindrical outer peripheral surface of the main body portion 11 so as to protrude outward in the radial direction of the main body portion 11. The annular protruding portion 19 functions as a stopper that defines an insertion depth of the main body portion 11 when the main body portion 11 is inserted into the attachment hole 63 in the outer wall 60 of the case.

Figure 5A:
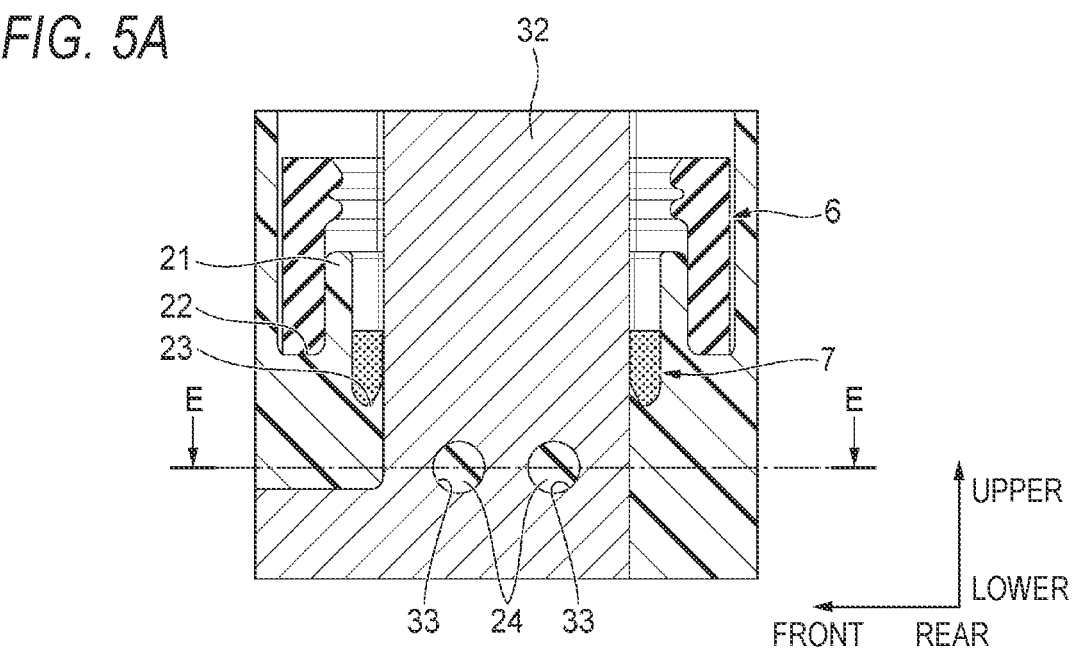
FIG. 5A is an enlarged view of a portion D in FIG. 3A.

As shown in FIG. 5A, a substantially rectangular cylindrical wall 21 protruding upward is formed on a bottom surface of the fitting recessed portion 14 of the connector portion 13 so as to face a substantially rectangular side face of the fitting recessed portion 14 (as viewed from above) with a gap therebetween. As a result, a substantially rectangular annular recessed portion 22 recessed downward is defined by the bottom surface and the side face of the fitting recessed portion 14 and the cylindrical wall 21. A rubber packing 6 is inserted into and fixed to the recessed portion 22. When the counterpart connector is fitted to the connector portion 13, the packing 6 exhibits a water-stop function of preventing water from entering through a fitting portion between the counterpart connector and the connector portion 13.

As shown in FIG. 5A, a recessed portion 23 recessed downward is formed on the bottom surface of the fitting recessed portion 14 of the connector portion 13 around a base portion (lower end portion) of the exposed portion 32 of each of the bus bars 3 in a region surrounded by the cylindrical wall 21. The recessed portion 23 is filled with a potting material 7 and cured. The potting material 7 exhibits a water-stop function of preventing water from entering through a boundary between the housing 2 and the bus bars 3. The housing 2 has been described.

Figure 4A:
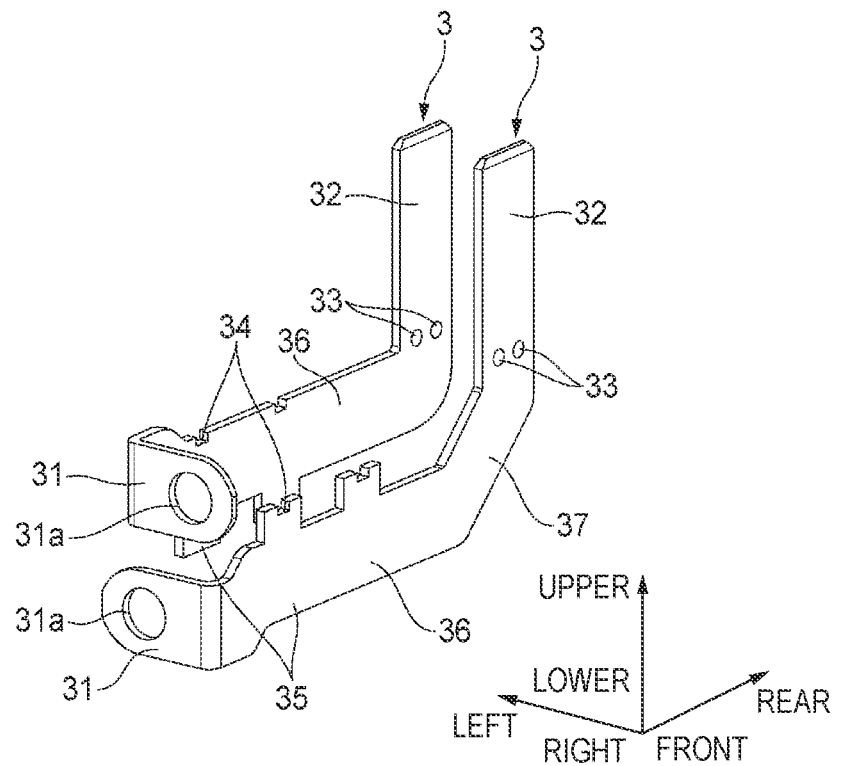
FIGS. 4A to 4C show a pair of bus bars shown in FIG. 1.

Next, the pair of bus bars 3 will be described. As can be understood from FIGS. 2 to 4, the pair of bus bars 3 are held in the housing 2 by the insert molding so as to be spaced apart from each other in the left-right direction. As shown in FIG. 4A, the right bus bar 3 and the left bus bar 3 are common in that they have a substantially L shape as a whole when viewed in the left-right direction, and have different shapes from each other. Each of the bus bars 3 is formed by pressing and bending a metal plate. Of the pair of bus bars 3, one bus bar 3 functions as a positive side conductive portion, and the other bus bar 3 functions as a negative side conductive portion.

Figure 4B:
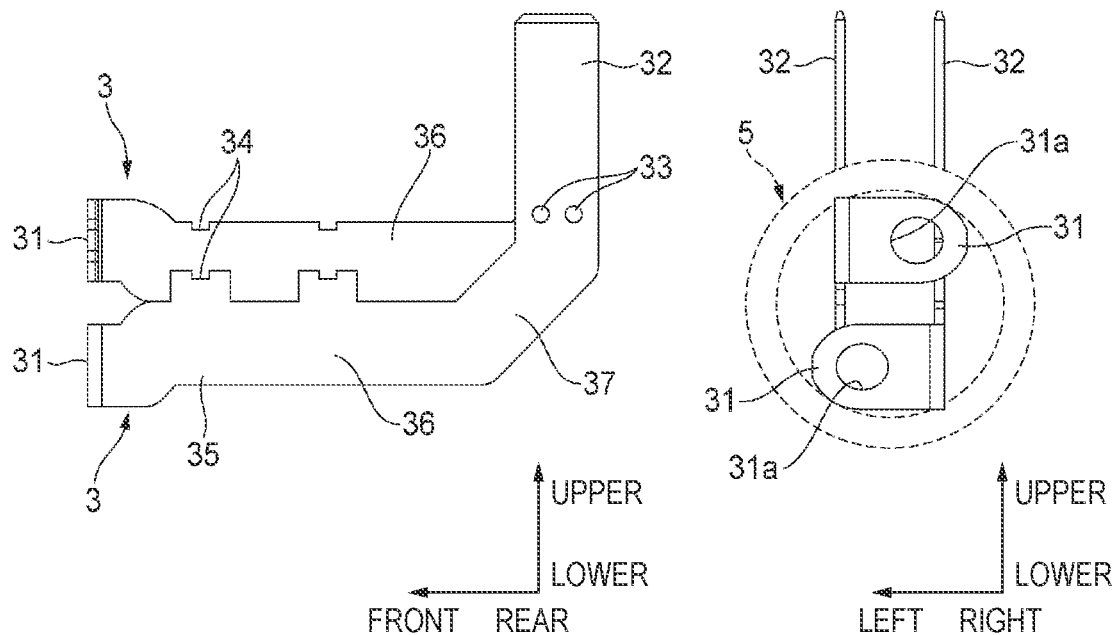

Except for the fastened portions 31, each of the bus bars 3 has a flat plate portion whose plate thickness direction is oriented in the left-right direction and having the substantially L shaped when viewed from the left-right direction. The flat plate portion has a shape corresponding to the above-described substantially L shape of the housing 2 when viewed in the left-right direction. More specifically, as shown in FIGS. 3A and 4A, the left bus bar 3 has the above-described substantially L shape by disposing and connecting a main body portion 36 embedded in the housing 2 and extending in the front-rear direction and the exposed portion 32 extending in the up-down direction so as to be substantially orthogonal to each other. Meanwhile, as shown in FIGS. 3B, 4A, and 4B, the right bus bar 3 includes the main body portion 36 embedded in the housing 2 and extending in the front-rear direction, the exposed portion 32 extending in the up-down direction, and a connecting portion 37 extending obliquely from a lower front side to an upper rear side. The right bus bar 3 has the above-described substantially L shape by disposing the main body portion 36 and the exposed portion 32 so as to substantially orthogonal to each other and connecting these two by the connecting portion 37. As shown in FIG. 3B, the connecting portion 37 extends along the lower face of the connecting portion 12 of the housing 2 at the substantially same inclination as the lower surface of the connecting portion 12. In other words, since the right bus bar 3 has the connecting portion 37 having such a shape, the lower face of the connecting portion 12 of the housing 2 can be formed into a shape inclined in an oblique direction. As shown in FIG. 3A, the left bus bar 3 is disposed at a position at which the left bus bar 3 does not interfere with the lower face of the connecting portion 12. As shown in FIG. 4B, the main body portion 36 of the left bus bar 3 and the main body portion 36 of the right bus bar 3 are offset from each other in the up-down direction due to the difference in the shapes of the right and left bus bars 3. As described above, since the left and right bus bars 3 have the above-described shapes, the lower face of the connecting portion 12 of the housing 2 can be inclined as described above, and a size of an outer shape of the housing 2 can be reduced.

Figure 4C:
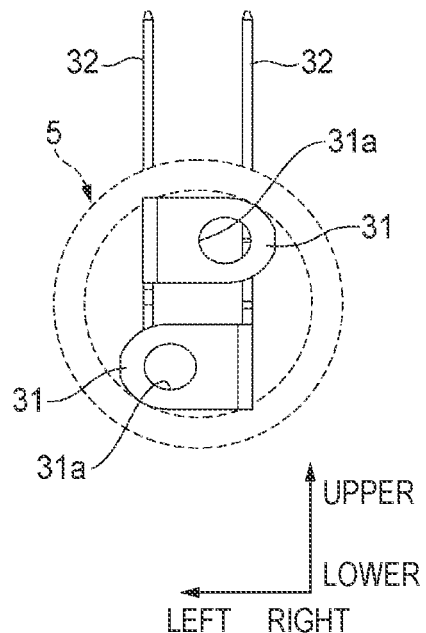

As shown in FIG. 4A, the fastened portion 31 of the left bus bar 3 is a flat plate-shaped portion that is bent from a front end portion of the main body portion 36 and extends rightward, and the fastened portion 31 of the right bus bar 3 is a flat plate-shaped portion that is bent from a front end portion of the main body portion 36 and extends leftward. Each of the fastened portions 31 is formed with a bolt through hole 31a penetrating in the plate thickness direction (that is, the front-rear direction). In this way, since the fastened portions 31 are bent from the front end portions of the main body portions 36 and extend in the left-right direction, a length of the bus bars 3 in the front-rear direction (eventually, a length of the connector 1) can be reduced as compared to a case in which the fastened portions 31 continuously extend forward from the front end portions of the main body portions 36. Further, the fastened portions 31 of the left and right bus bars 3 are disposed so as to be offset from each other in the up-down direction being different with each other. In this way, the fastened portions 31 of the left and right bus bars 3 are disposed so as to be offset from each other, whereby the interval between the left and right bus bars 3 (in particular, as shown in FIG. 4C, the main body portions 36 passing through an inside of the O-ring 5 indicated by broken lines) can be reduced. As a result, the pair of bus bars 3 can be rationally disposed in the outer diameter of the main body portion 11 (that is, in the O-ring 5) without excessively increasing the outer diameter of the main body portion 11 of the housing 2.

In each of the bus bars 3, a pair of through holes 33 are formed so as to be disposed in the front-rear direction at a position adjacent to a lower side of the base portion (lower end portion) of the exposed portion 32. In each of the bus bars 3, a recessed portion 34 recessed downward is formed at an upper edge of a portion adjacent to s rear side of the fastened portion 31. Hereinafter, for each of the bus bars 3, a lower edge corresponding to the recessed portion 34 (positioned directly below the recessed portion 34) at the position adjacent to the rear side of the fastened portion 31 is referred to as a "lower edge 35".

As shown in FIGS. 3A to 3C, in each of the bus bars 3, substantially the entire main body portion 36 is embedded in the main body portion 11 and the connecting portion 12 of the housing 2 by the insert molding. Meanwhile, the fastened portions 31, the exposed portions 32, the recessed portions 34, and the lower edges 35 of the bus bars 3 are exposed to an outside from the housing 2.

Specifically, as shown in FIG. 1 and the like, the fastened portion 31 of the left bus bar 3 is disposed so as to expose from the front end surface of the main body portion 11 on the upper side of the partition wall 15, extend rightward on a front side of the nut 4 positioned on the upper side of the partition wall 15, and cover the nut 4 (see FIG. 2C). Similarly, the fastened portion 31 of the right bus bar 3 is disposed so as to expose from the front end surface of the main body portion 11 on the lower side of the partition wall 15, extends leftward on a front side of the nut 4 positioned on the lower side of the partition wall 15, and covers the nut 4.

For each of the fastened portion 31 and the nut 4 positioned on the upper side of the partition wall 15 and the fastened portion 31 and the nut 4 positioned on the lower side of the partition wall 15, the gap L in the front-rear direction is provided between the fastened portion 31 and the nut 4 (see FIG. 2C), and the bolt through hole 31a of the fastened portion 31 and a female screw portion (not shown) of the nut 4 are coaxially disposed. The gap L is slightly larger than a plate thickness of the flat plate portion 43 of the terminal fitting 42 of the terminal-equipped electric wire 8. The terminal fitting 42 of the terminal-equipped electric wire 8 is connected to the fastened portion 31 by the flat plate portion 43 being inserted into the gap L and fastened and fixed to the fastened portion 31 (see FIGS. 6C and 7A to 7C).

In this way, the fastened portion 31 (of the left bus bar 3) positioned on the upper side of the partition wall 15 and the fastened portion 31 (of the right bus bar 3) positioned on the lower side of the partition wall 15 are disposed so as to extend in opposite directions to each other in the left-right direction, whereby, as shown in FIG. 4C, when viewed in the front-rear direction, substantially the entire pair of fastened portions 31 are positioned in a circular region inside the O-ring 5 mounted in the annular recessed portion 18 of the main body portion 11. Accordingly, when the main body portion 11 is inserted into the attachment hole 63, the pair of fastened portions 31 are prevented from interfering with a peripheral edge of the attachment hole 63 or the like. Further, when the O-ring 5 is externally inserted into the main body portion 11 from a front side of the main body portion 11 and is attached to the annular recessed portion 18, the pair of fastened portions 31 are less likely to become an obstacle.

As shown in FIG. 2A, the exposed portions 32 of the pair of bus bars 3 are disposed so as to be exposed inside the fitting recessed portion 14 of the connector portion 13, face each other at an interval in the left-right direction, and extend in the up-down direction. The pair of exposed portions 32 have the same shape.

As shown in FIGS. 3A and 3B, for each of the bus bars 3, the recessed portion 34 is exposed in one of the plurality of lightening grooves 17 formed in the main body portion 11 of the housing 2 (see FIG. 2A), and the lower edge 35 is exposed in another one of the plurality of lightening grooves 17. This configuration is implemented by, when the bus bars 3 are insert-molded in the housing 2, holding the recessed portions 34 and the lower edges 35 such that the recessed portions 34 and the lower edges 35 are vertically sandwiched between a pair of upper and lower inner surfaces of a molding die, and engaging a protrusion (not shown) formed on the upper inner surface of the molding die with the recessed portions 34. In this way, by engaging the protruding portion of the molding die with the recessed portions 34, even when the bus bars 3 receive flow pressure of a molten resin flowing in the die, a positional deviation of the bus bars 3 (in particular, in the front-rear direction) or the like is less likely to occur. As a result, the positional accuracy of the bus bars 3 with respect to the housing 2 can be improved, and the gaps L (see FIG. 2C) between the fastened portions 31 of the bus bars 3 and the nuts 4 can be prevented from being excessively large or excessively small. Therefore, it is possible to prevent insufficient temporary fixing of the terminal fittings 42, which will be described later, and weak co-fastening by a bolt 50, which will be described later, due to the gap L being too large. Further, it is possible to prevent a situation in which it is difficult to temporarily fix the terminal fitting 42 to the gaps L due to the gap L being too small.

Further, since the recessed portions 34 are exposed in grooves of the lightening grooves 17, peripheral components can be prevented from being unintentionally caught by the recessed portion 34 when the connector 1 is used. Further, in the state in which the connector 1 is assembled to the case (see FIG. 6B), the lightening grooves 17 (that is, the recessed portions 34) are positioned inside the case. In other words, the recessed portions 34 are provided in the bus bars 3 so as to be positioned inside the case when the connector 1 is used. Therefore, when the connector 1 is used, the recessed portions 34 are exposed to the oil stored in the case. In this regard, in the present example, portions of the bus bars 3 around the recessed portions 34 are surrounded by a groove inner wall of the lightening grooves 17. Therefore, even when the conductive fine particles (for example, so-called contamination such as abrasion powder of gears) are contained in the oil, unintended conduction between the bus bars 3 and peripheral conductive component can be prevented. When the recessed portions 34 are positioned outside the case and exposed to outside air, foreign matter such as water may enter the inside of the case through a minute gap that may be generated between the resin constituting the housing 2 and the bus bars 3 (recessed portions 34). Also, in terms of avoiding such foreign matter intrusion, there is an advantage in that the recessed portions 34 are positioned inside the case.

Figure 5B:
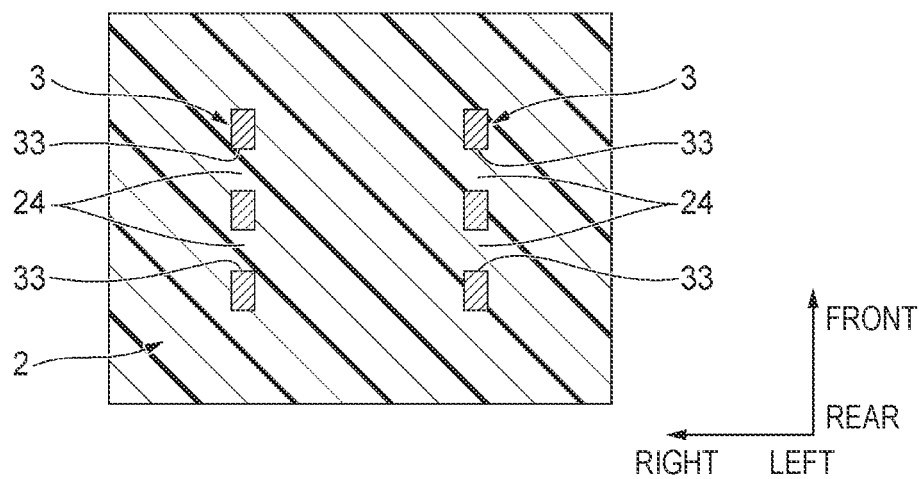
FIG. 5B is a cross-sectional view taken along a line E-E in FIG. 5A.
Figure 5C:
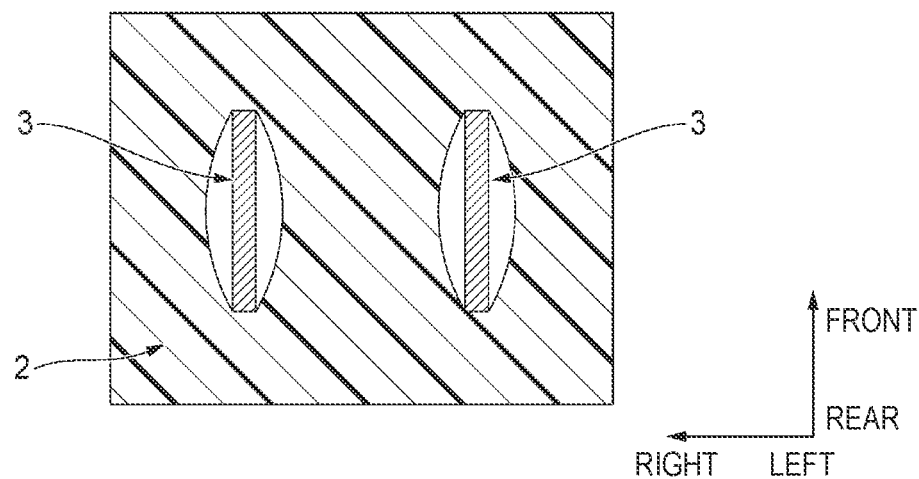
FIG. 5C is a view corresponding to FIG. 5B in a comparative example.

For each of the bus bars 3, a portion in which the pair of through holes 33 are formed is embedded in the housing 2 by the insert molding. Therefore, as shown in FIGS. 5A and 5B, the resin material also enters insides of the through holes 33, and thus bridge portions 24 that connects the resin material positioned in the vicinity of both left and right end edges of the through holes 33 are formed in the inside of the through holes 33. Therefore, at a time of molding the housing 2, the shrinkage (so-called sinkage) of the resin, which is recessed in a direction away from surfaces of the bus bars 3, is less likely to occur in the vicinity of the recessed portions 23 (see FIG. 5A) which are positioned in the periphery of the through holes 33 and are filled with the potting materials 7. Therefore, the potting materials 7 can be prevented from leaking out from the recessed portions 23 through the gap generated by the sinkage. When the through holes 33 are not formed in the bus bars 3, which is different from the present example, sinkage recessed in the direction away from the surfaces of the bus bars 3 as shown in FIG. 5C is likely to occur at the positions in the vicinity of the recessed portions 23 in the housing 2. This sinkage may cause the above-described leakage of the potting materials 7. The members of the connector 1 have been described above.

Next, a procedure for assembling the connector 1 to the outer wall 60 of the case and a procedure for assembling the pair of terminal-equipped electric wires 8 to the connector 1 will be described with reference to FIGS. 6A to 6C and 7A to 7C. First, the connector 1 is assembled to the outer wall 60 of the case. As shown in FIGS. 6A and 6B, the main body portion 11 of the housing 2 is inserted from the outer surface 61 side into the attachment hole 63 having a cylindrical inner peripheral surface and formed in the outer wall 60 of the case until the annular protruding portion 19 abuts against an edge portion of the attachment hole 63 on the outer surface 61 side, and the main body portion 11 and the outer wall 60 are locked to each other by a predetermined locking mechanism (not shown), whereby the assembly is achieved.

In a state in which the assembly of the connector 1 to the outer wall 60 of the case is completed (see FIG. 6B), a minute annular gap between the cylindrical outer peripheral surface of the main body portion 11 and the inner peripheral surface of the attachment hole 63 of the outer wall 60 is liquid-tightly and air-tightly sealed by the O-ring 5. As a result, the air and water positioned on the outer surface 61 side of the outer wall 60 of the case are separated from the oil positioned on the inner surface 62 side of the outer wall 60 of the case. The fastened portions 31 of the pair of bus bars 3 and the recessed portions 34 and the lower edges 35 of the bus bars 3 are positioned inside the case.

Next, the pair of terminal-equipped electric wires 8 are assembled to the connector 1. First, the other end portions of the pair of terminal-equipped electric wires 8 (end portions on a side opposite to the one end portions to which the terminal fittings 42 are connected) are respectively connected to devices (for example, an oil pump or the like, not shown) disposed inside the case. The other end portions of the pair of terminal-equipped electric wires 8 may be connected to the device before the connector 1 is assembled to the outer wall 60 of the case.

Next, the flat plate portions 43 of the terminal fittings 42 of the pair of terminal-equipped electric wires 8 are fastened and fixed to the fastened portions 31 of the pair of bus bars 3, respectively. Here, when a work of fastening and fixing the terminal fittings 42 (flat plate portions 43) of the terminal-equipped electric wires 8 extending from the devices disposed inside the case to the pair of fastened portions 31 positioned inside the case is performed, since the internal space of the case is limited, the electric wires 41 of the terminal-attached electric wires 8 may need to be largely curved (that is, the electric wires 41 may be bent with a small radius of curvature). In particular, when the devices are positioned near the pair of fastened portions 31, this need is increased. In this case, since the work is performed in the narrow internal space of the case while resisting the elastic force generated by the curved electric wires 41, it is difficult to improve workability of the operation. In particular, when an electric wire having a large diameter (so-called thick electric wire) is used as the electric wire 41, or when a degree of curvature of the electric wire 41 is large, the elastic force generated by the electric wire 41 is also large, which makes the work more difficult.

Figure 7A:
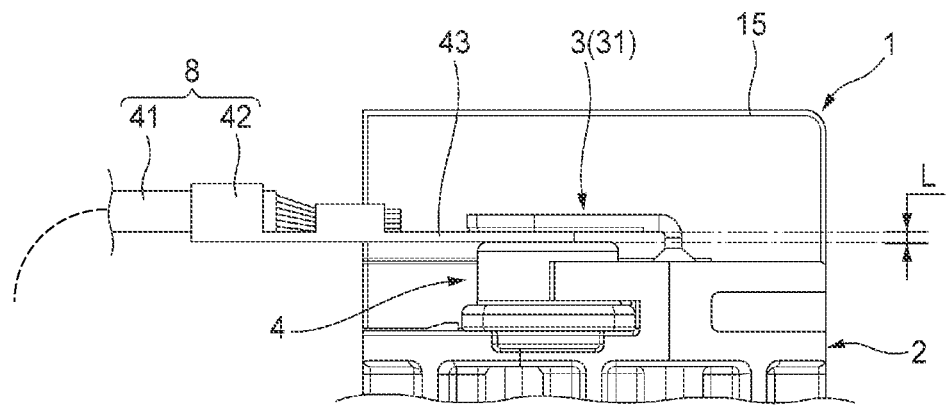
FIGS. 7A to 7C are views showing, in time series, a procedure for assembling a terminal fitting of a terminal-equipped electric wire to the connector shown in FIG. 1.
Figure 7B:
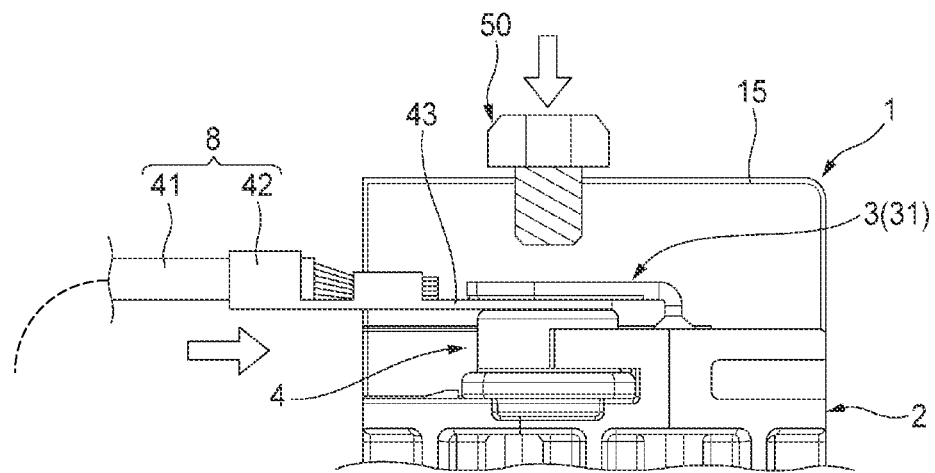
Figure 7C:
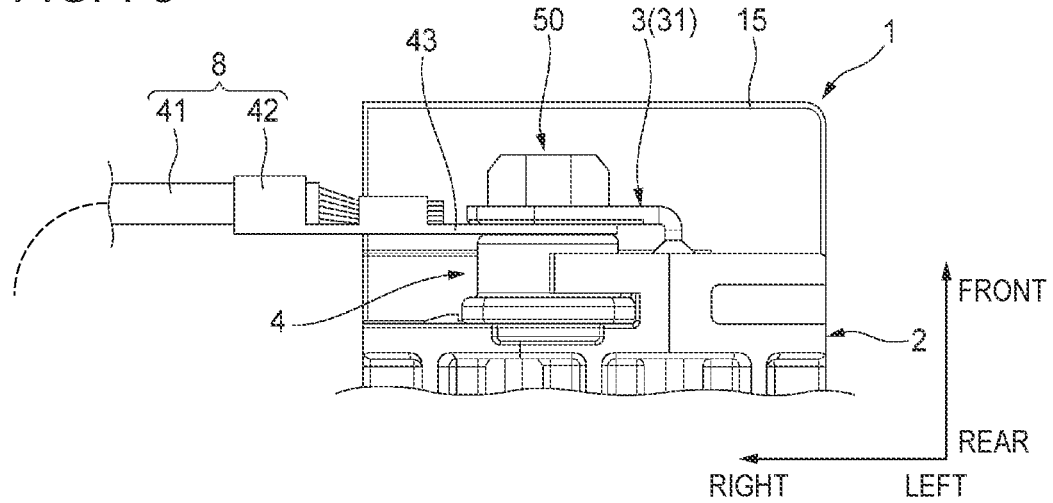

Regarding to this point, in the present example, first, as shown in FIG. 6C, the flat plate portion 43 of one terminal fitting 42 of the pair of terminal fittings 42 is brought closer to the upper fastened portion 31 from the right side while the pair of electric wires 41 extending from the device are curved. FIGS. 7A-7C schematically illustrate an exemplary curved path of the electric wire 41 in a curved state. Then, as shown in FIG. 7A, the flat plate portion 43 is inserted into the gap L between the upper fastened portion 31 and the nut 4. Similarly, the flat plate portion 43 of the other terminal fitting 42 of the pair of terminal fittings 42 is brought close to the lower fastened portion 31 the left side (see FIG. 6C), and is inserted into the gap L between the lower fastened portion 31 and the nut 4.

As described above, when the flat plate portion 43 of each of the terminal fittings 42 is inserted into the gap L between the fastened portion 31 and the nut 4, the flat plate portion 43 is pressed against the fastened portion 31 or the nut 4 by the elastic force generated by the electric wire 41, and the flat plate portion 43 (that is, the terminal fitting 42) can be held in the gap L by the frictional force. In other words, before the terminal fitting 42 is fastened to the fastened portion 31, the terminal fitting 42 can be temporarily fixed (temporarily placed) in the gap L between the fastened portion 31 and the nut 4. Accordingly, an operator can use the bolt 50, a fastening tool, or the like used for fastening by releasing his or her hand from the electric wire 41 or the terminal fitting 42. Therefore, it is not necessary for the operator to perform bolt fastening or the like while pressing the terminal-equipped electric wire 8, and thus the bolt fastening work is facilitated. Further, when the terminal fitting 42 is temporarily fixed in this way, the flat plate portion 43 can be held in the gap L between the fastened portion 31 and the nut 4 even if the bolt through hole 43a (see FIG. 6C) of the flat plate portion 43 is not necessarily aligned with the bolt through hole 31a (see FIG. 6C) of the fastened portion 31 and the female screw portion of the nut 4. Therefore, the workability of the work of connecting the terminal-equipped electric wire 8 to the connector 1 can be further improved.

Then, from a state in which the pair of terminal fittings 42 are temporarily fixed, the bolt through hole 43a of the flat plate portion 43 is aligned with respect to the upper fastened portion 31, and then, as shown in FIG. 7B, the bolt 50 is inserted in an order of the bolt through hole 31a and the bolt through hole 43a from the upper side, and screwed into the female screw portion of the nut 4 positioned on the lower side of the flat plate portion 43, whereby the flat plate portion 43 (that is, the terminal fitting 42) and the upper fastened portion 31 are fastened together (see FIG. 7C). Similarly, the bolt through hole 43a of the flat plate portion 43 is aligned with respect to the lower fastened portion 31, and then the bolt 50 is inserted in an order of the bolt through hole 31a and the bolt through hole 43a from the lower side, and screwed into the female screw portion of the nut 4 positioned on the upper side of the flat plate portion 43, whereby the flat plate portion 43 (that is, the terminal fitting 42) and the lower fastened portion 31 are fastened together. Thus, the assembly of the pair of terminal-equipped electric wires 8 to the connector 1 is completed.

Figure 8:
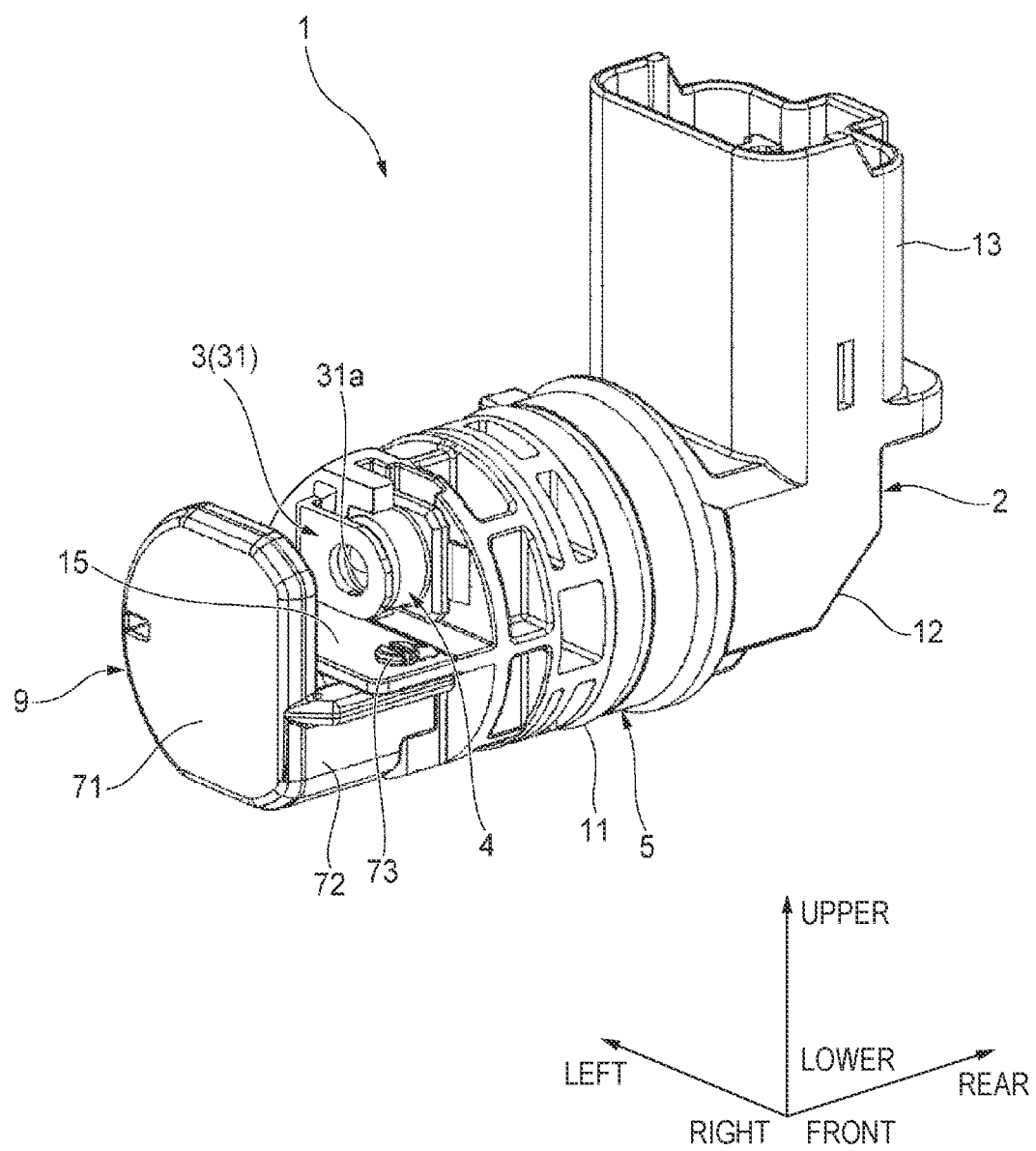
FIG. 8 is a perspective view showing a connector according to a modification.

In the example shown in FIG. 1, the pair of fastened portions 31 and the pair of nuts 4 positioned on the front end surface of the main body portion 11 are exposed to the outside. In contrast, as shown in FIG. 8, a cover 9 that covers the pair of fastened portions 31 and the pair of nuts 4 may be provided. Accordingly, the peripheral components can be prevented from unintentionally coming into contact with the fastened portions 31 or the like when the connector 1 is assembled to the case or the like. Further, as will be described in detail later, by increasing a creepage distance between the pair of fastened portions 31, unintended conduction between the pair of bus bars 3 can be prevented.

Hereinafter, the cover 9 shown in FIG. 8 will be described. The cover 9 is made of transparent resin or the like, and is supported by the partition wall 15 of the main body portion 11 so as to be rotatable (openable and closable) between a closed position (see FIGS. 8 and 9A) at which the cover 9 covers the pair of fastened portions 31 and the pair of nuts 4 and an open position (see FIG. 9B) at which the cover 9 does not cover the pair of fastened portions 31 and the pair of nuts 4.

Figure 9A:
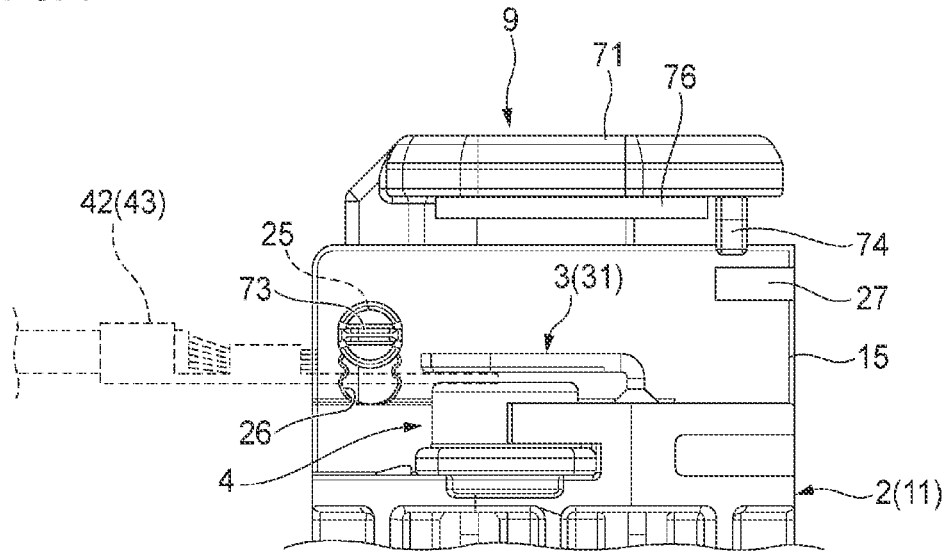
FIGS. 9A and 9B are views showing, in time series, a first half of a procedure for assembling a terminal fitting of a terminal-equipped electric wire to the connector shown in FIG. 8.

As shown in FIGS. 8, 9A, and the like, the cover 9 integrally includes a flat plate portion 71 extending in a direction orthogonal to the front-rear direction at the closed position, and an extending portion 72 extending rearward from a portion including a lower right corner portion of a peripheral edge of the flat plate portion 71 at the open position. When viewed in the front-rear direction, the entire flat plate portion 71 at the closed position is positioned in the circular region inside the O-ring 5 mounted in the annular recessed portion 18 of the main body portion 11. Accordingly, when the main body portion 11 is inserted into the attachment hole 63, the flat plate portion 71 at the closed position is prevented from interfering with the peripheral edge or the like of the attachment hole 63. Further, when the O-ring 5 is externally inserted into the main body portion 11 from the front side of the main body portion 11 and is attached to the annular recessed portion 18, the cover 9 is less likely to become an obstacle.

The extending portion 72 is integrally provided with a rotating shaft portion 73 extending in the up-down direction. The rotation shaft portion 73 is selectively rotatably inserted into a temporary locking hole 25 and a full locking hole 26 that are provided in a right end portion of the partition wall 15 of the main body portion 11. The temporary locking hole 25 and the full locking hole 26 are disposed such that the temporary locking hole 25 is positioned in front of the full locking hole 26, and the temporary locking hole 25 and the full locking hole 26 are aligned in the front-rear direction. The temporary locking hole 25 and the full locking hole 26 communicate with each other in the front-rear direction via a narrow gap. Therefore, when a rearward force is applied to the rotating shaft portion 73 (the cover 9 at the closed position) in a state in which the rotating shaft portion 73 is rotatably inserted into the temporary locking hole 25, the rotating shaft portion 73 moves from the temporary locking hole 25 to the full locking hole 26, and the rotating shaft portion 73 can be shifted to a state in which the rotating shaft portion 73 is rotatably inserted into the full locking hole 26.

A locking portion 74 is provided on a rear surface of a left end portion of the flat plate portion 71 at the closed position. The locking portion 74 can be locked to a locked portion 27 provided at a left end portion of the partition wall 15 in a state in which the cover 9 is at the closed position and the rotating shaft portion 73 is inserted into the full locking hole 26.

Figure 11A:
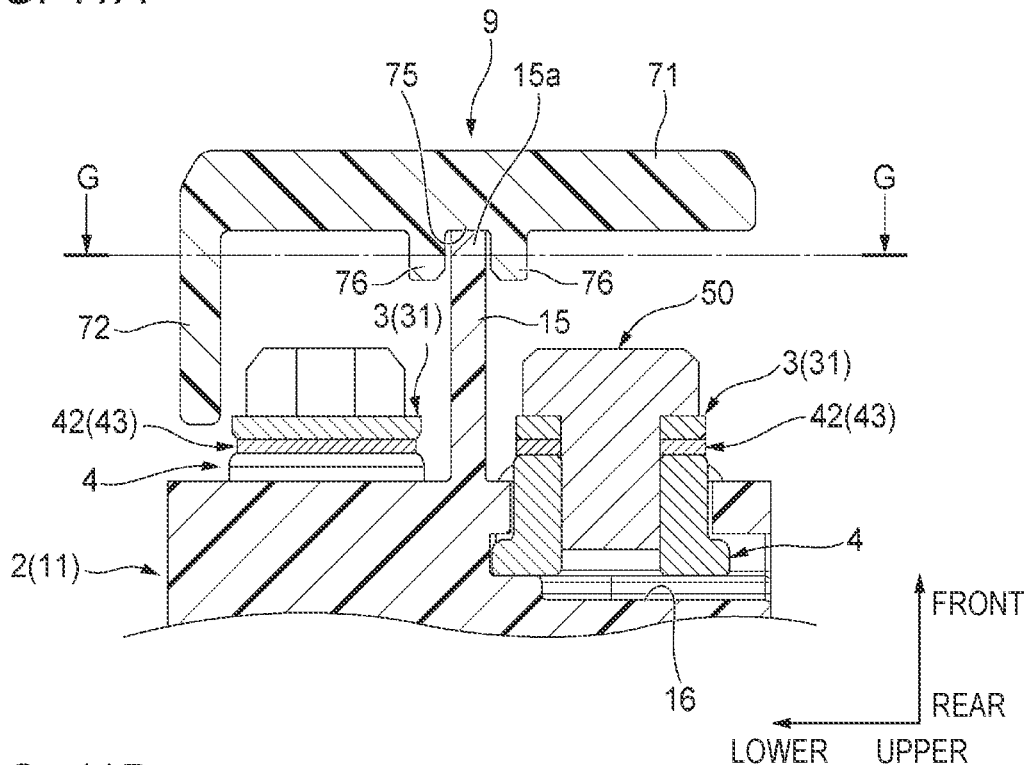
FIG. 11A is a cross-sectional view taken along a line F-F of FIG. 10B.
Figure 11B:
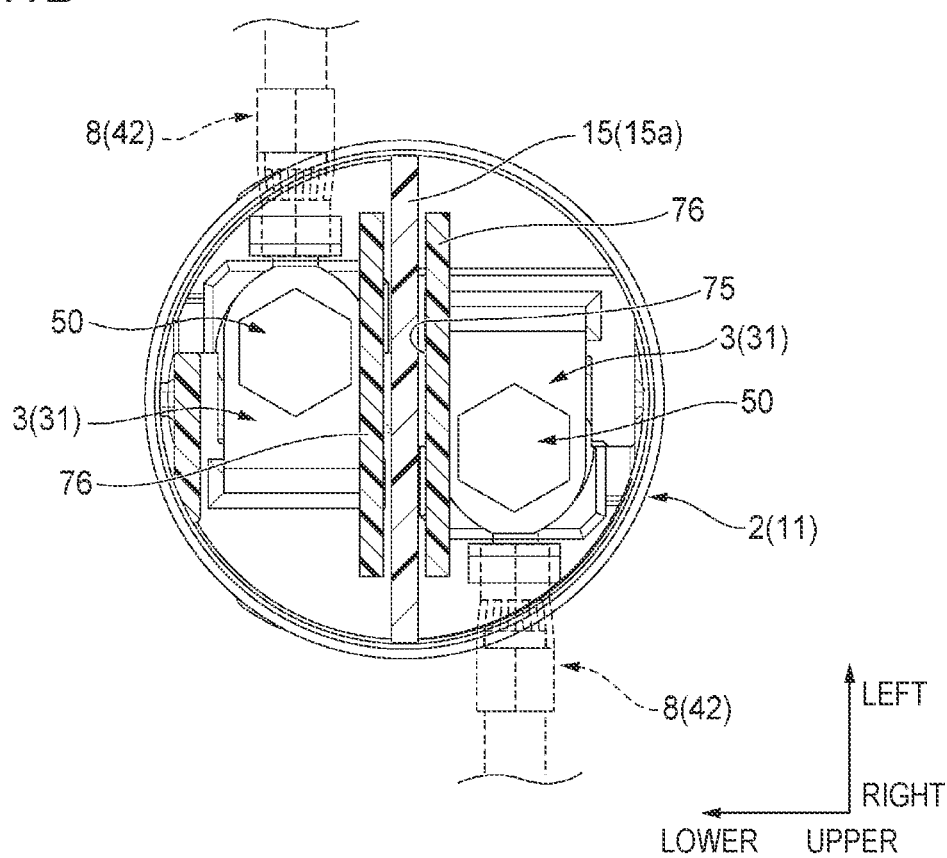
FIG. 11B is a cross-sectional view taken along a line G-G of FIG. 11A.

The flat plate portion 71 is formed with a pair of ribs 76 extending in the left-right direction at an interval in the up-down direction on a rear surface of a central portion of the flat plate portion 71 in the up-down direction at the closed position (see FIGS. 11A and 11B). Accordingly, a recessed portion 75 defined by the pair of ribs 76 is formed so as to extend in the left-right direction. In the state in which the cover 9 is at the closed position and the rotation shaft portion 73 is inserted into the full locking hole 26, a protruding end portion (protruding portion) 15a extending in the left-right direction of the partition wall 15 is inserted into the recessed portion 75 (see FIGS. 11A and 11B). Accordingly, the protruding portion 15a and the recessed portion 75 mesh with each other at a position sandwiched between the pair of fastened portions 31, thereby obtaining a structure (so-called labyrinth structure) in which an entry path of the oil to pass through the partition wall 15 is lengthened. As a result, the unintended conduction between the pair of bus bars 3 can be more reliably prevented.

In the example shown in FIG. 8, when the connector 1 is assembled to the outer wall 60 of the case, the main body portion 11 is inserted into the attachment hole 63 of the outer wall 60 of the case in the state in which the cover 9 is at the closed position and the rotating shaft portion 73 is inserted into the temporary locking hole 25. Accordingly, the periph- eral components can be prevented from unintentionally coming into contact with the fastened portions 31 and the nuts 4.

Figure 9B:
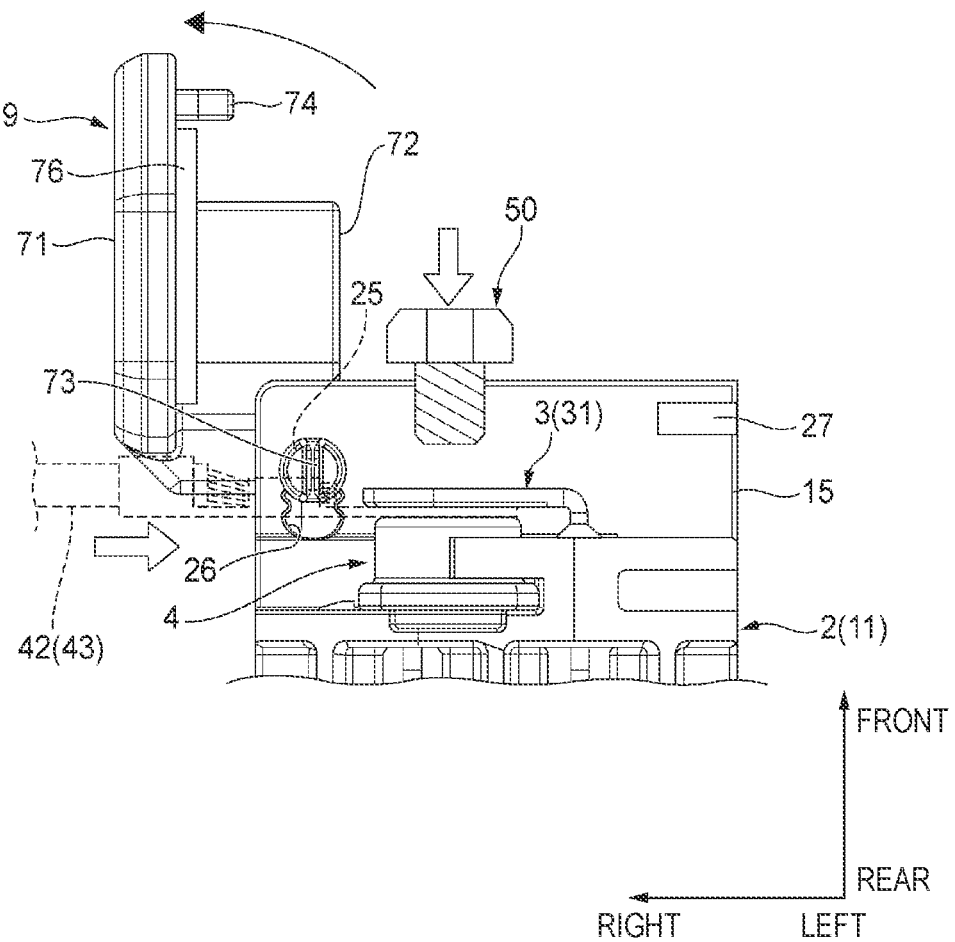

After the assembling of the connector 1 to the outer wall 60 of the case is completed, as shown in FIG. 9A, the flat plate portion 43 of the terminal fitting 42 is inserted into the gap L between the fastened portion 31 and the nut 4 and is temporarily fixed while maintaining the state in which the cover 9 is at the closed position and the rotating shaft portion 73 is inserted into the temporary locking hole 25. Next, as shown in FIG. 9B, the fastened portion 31 and the flat plate portion 43 are fastened together by the bolt 50 in a state in which the cover 9 is opened and held at the open position while maintaining the state in which the rotating shaft portion 73 is inserted into the temporary locking hole 25. Here, a reason why the cover 9 is opened is that the flat plate portion 71 covers the fastened portion 31 in a state in which the cover 9 is closed, and the flat plate portion 71 becomes an obstacle.

Figure 10A:
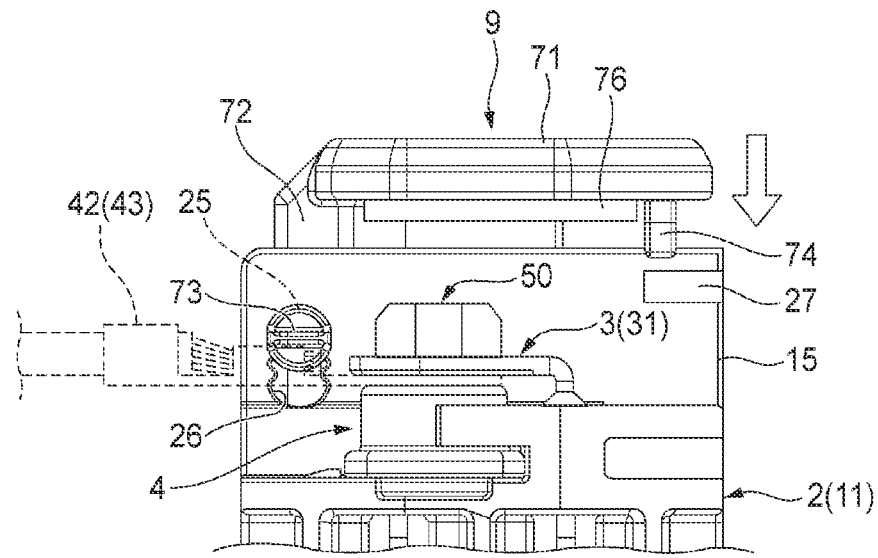
FIGS. 10A and 10B are views showing, in time series, a latter half of the procedure for assembling the terminal fitting of a terminal-equipped electric wire to the connector shown in FIG. 8.
Figure 10B:
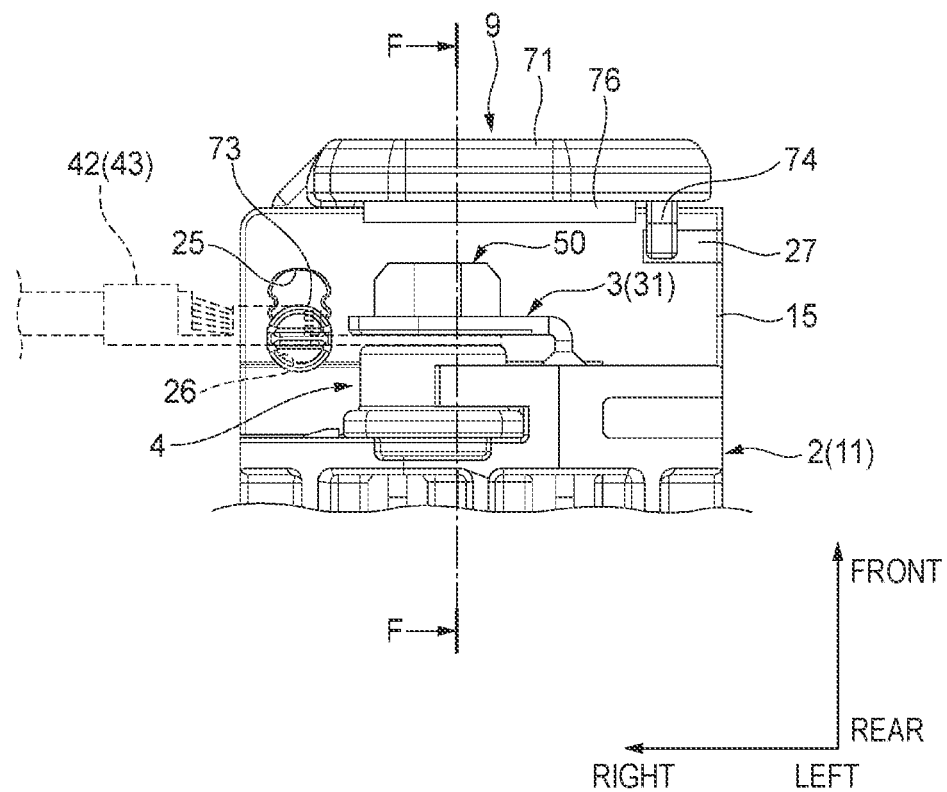

After the completion of the co-fastening work by the bolt 50, as shown in FIG. 10A, the cover 9 is closed again while maintaining the state in which the rotating shaft portion 73 is inserted into the temporary locking hole 25. Then, a rearward force is applied to the cover 9 (the flat plate portion 71). Accordingly, as shown in FIG. 10B, the rotating shaft portion 73 moves from the temporary locking hole 25 to the full locking hole 26, the locking portion 74 of the cover 9 is locked to the locked portion 27 of the partition wall 15, and the protruding portion 15a of the partition wall 15 is inserted into the recessed portion 75 of the cover 9, thereby forming the labyrinth structure described above. Accordingly, the work of assembling the terminal-equipped electric wires 8 to the connector 1 is completed.

In a state in which the work of assembling the terminal-equipped electric wires 8 to the connector 1 is completed, the locking portion 74 of the cover 9 is locked to the locked portion 27 of the partition wall 15, whereby the cover 9 is prevented from being unintentionally opened. Further, since the labyrinth structure described above is obtained, the unintended conduction between the pair of bus bars 3 can be reliably prevented.

Figure 12:
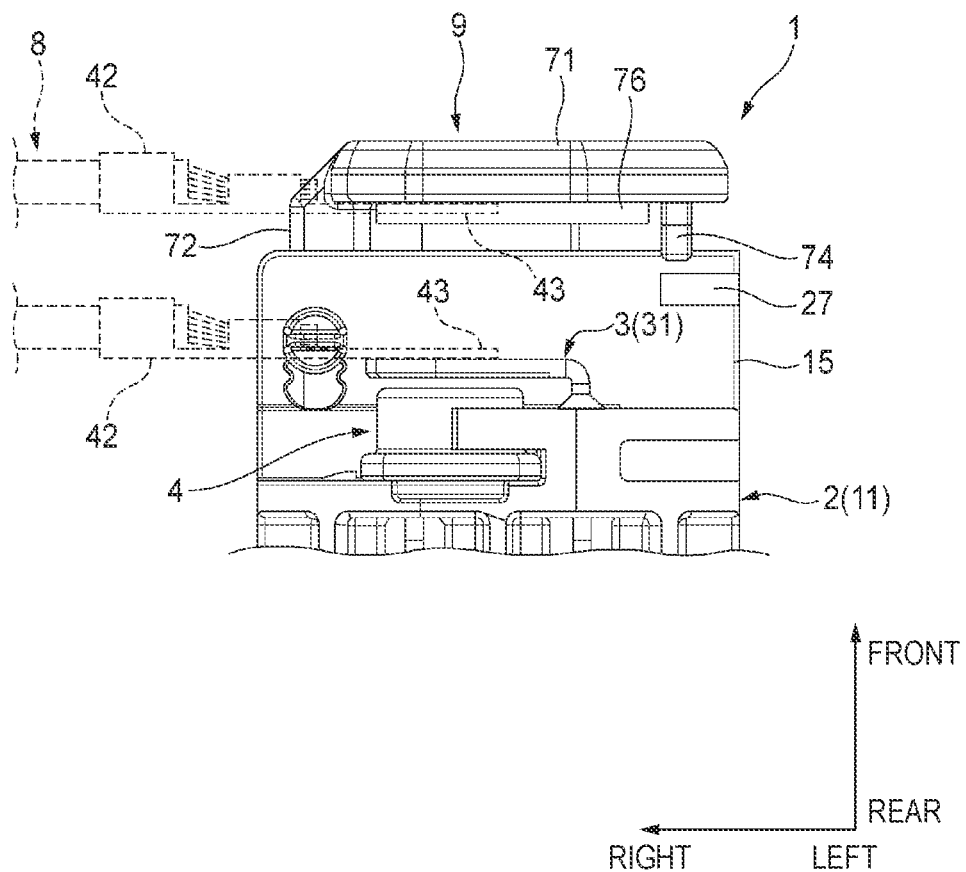
FIG. 12 is a diagram corresponding to FIG. 9A according to another modification.

In the example shown in FIG. 9A, the flat plate portion 43 of the terminal fitting 42 is inserted into the gap L between the fastened portion 31 and the nut 4 and is temporarily fixed in a state in which the cover 9 is at the closed position and the rotating shaft portion 73 is inserted into the temporary locking hole 25. Meanwhile, as shown in FIG. 12, the flat plate portion 43 of the terminal fitting 42 may be inserted into a gap between the fastened portion 31 and the flat plate portion 71 of the cover 9 and is temporarily fixed in the state in which the cover 9 is at the closed position and the rotating shaft portion 73 is inserted into the temporary locking hole 25. In this case, when the flat plate portion 43 is inserted into the gap between the fastened portion 31 and the flat plate portion 71, the flat plate portion 43 is pressed against the fastened portion 31 or the flat plate portion 71 by the elastic force generated by the electric wire 41, and the flat plate portion 43 (that is, the terminal fitting 42) can be held in the gap by the frictional force. Further, when the terminal fitting 42 is temporarily fixed in this way, the flat plate portion 43 can be held in the gap between the fastened portion 31 and the flat plate portion 71 even if the bolt through hole 43a of the flat plate portion 43 is not necessarily aligned with the bolt through hole 31a of the fastened portion 31 and the female screw portion of the nut 4. Therefore, the workability of the work of connecting the terminal-equipped electric wire 8 to the connector 1 can be further improved. In this way, when the flat plate portion 43 (that is, the terminal fitting 42) is temporarily fixed to the gap between the fastened portion 31 and the flat plate portion 71, as in the above-described embodiment, the flat plate portion 43 is then inserted into the gap L between the fastened portion 31 and the nut 4, and the fastened portion 31 and the flat plate portion 43 are fastened together by the bolt 50.

Functions and Effects

As described above, according to the connector 1 according to the present embodiment and the holding structure of terminal-equipped electric wire according to the present embodiment, after the housing 2 is assembled to the outer wall 60 of the case, when the terminal fittings 42 are connected (that is, bolted) to the fastened portions 31 of the bus bars 3 while the electric wires 41 extending from the device or the like disposed inside the case are curved, when the terminal fittings 42 are inserted into the gaps L between the fastened portions 31 and the nuts 4, the terminal fittings 42 can be pressed against the fastened portions 31 or the nuts 4 by the elastic force generated by the electric wires 41, and the terminal fittings 42 can be held in the gaps by the frictional force. In other words, before the terminal fittings 42 are fastened to the fastened portions 31, the terminal fittings 42 can be temporarily fixed (temporarily placed) in the gaps L between the fastened portions 31 and the nuts 4. Accordingly, the operator can use the bolts 50, the fastening tool, or the like by releasing his or her hand from the electric wires 41 or the terminal fittings 42. Therefore, it is not necessary for the operator to perform bolt fastening or the like while pressing the terminal-equipped electric wires 8, and thus the bolt fastening work is facilitated. Therefore, according to the present embodiment, the workability of the work of connecting the terminal-equipped electric wires 8 to the connector 1 can be improved.

Further, the fastened portions 31 of the bus bars 3 are disposed so as to extend from the body portions of the bus bars 3 (the portions of the substantially L-shaped body portions 36 extending in the front-rear direction) in a direction (left-right direction) intersecting the assembling direction (front-rear direction), and to cover the nuts 4. Accordingly, the length of the bus bars 3 in the assembling direction (front-rear direction) (eventually, the length of the connector 1) can be reduced as compared to the case in which the fastened portions 31 extend in the same direction as the body portion, and a work space inside the case can be increased. Therefore, the workability of the work of connecting the terminal-equipped electric wires 8 to the connector 1 can be further improved.

Further, by the partition wall 15 of the housing 2, it is possible to increase the insulation distance (in particular, the creepage distance) between the fastened portion 31 of the upper bus bar 3 and the fastened portion 31 of the lower bus bar 3. Accordingly, in particular, even when the liquid such as the lubricating oil is sealed inside like the transmission and the conductive fine particles (for example, so-called contamination such as abrasion powder of gears) are contained in the liquid, the unintended conduction between the pair of bus bars 3 can be prevented. Therefore, the reliability of the electrical connection by the connector 1 can be improved.

Other Embodiments

The present invention is not limited to the above-described embodiment, and various modifications can be used within the scope of the present invention. For example, the present invention is not limited to the above-described embodiment, and may be appropriately modified, improved or the like. In addition, materials, shapes, dimensions, numbers, arrangement positions, and the like of components in the embodiment described above are optional and are not limited as long as the present invention can be achieved.

In the above-described embodiment, the pair of bus bars 3 are insert-molded and held in the housing 2 of the connector 1. Meanwhile, one single bus bar 3 may be insert-molded and held in the housing 2 of the connector 1. In this case, the partition wall 15 of the connector 1 is unnecessary.

Further, in the above embodiment, the recessed portions 34 of the bus bars 3 are exposed in one of the plurality of lightening grooves 17 formed in the body portion 11 of the housing 2. Meanwhile, the recessed portions 34 of the bus bars 3 may be exposed at a position at which the plurality of lightening grooves 17 are not formed on the cylindrical outer peripheral surface of the body portion 11 of the housing 2.

Further, in the above-described embodiment, the connector 1 is attached to the outer wall 60 of the case (box-shaped body) such as the transmission. Meanwhile, the connector 1 may be attached to a wall portion other than the outer wall of the case (box-shaped body). For example, when the inside and the outside of the case are separated by multiple wall portions, the connector 1 may be attached to any one of the wall portions.

Here, features of the embodiment of the connector 1 and the holding structure of terminal-equipped electric wire according to the present invention described above will be briefly summarized and listed in the following[1] to [5].

[1]

A connector (1) includes:
- a housing (2) to be assembled to a wall portion (60) of a box-shaped body that is an attachment target;
- a bus bar (3) that is to be held by the housing (2) and including a body portion (36) extending so as to penetrate the wall portion (60), and a fastened portion (31) disposed on an inner side of the box-shaped body with respect to the wall portion (60) and connected to a terminal fitting (42) by fastening using a bolt (50); and
- a nut (4) that is to be held by the housing (2) with a gap (L) between the nut and the fastened portion (31), the gap allowing insertion of the terminal fitting (42), and that is to engage with the bolt (50) to fasten the fastened portion (31) and the terminal fitting (42) inserted into the gap (L) together.

[2]

The connector (1) according to [1], in which
the fastened portion (31) of the bus bar (3) is disposed so as to extend from the body portion (36) in a direction intersecting an extending direction of the body portion (36) and cover the nut (4).

[3]

The connector (1) according to [1] or [2], in which
a plurality of the bus bars (3) are included,
the housing (2) includes a partition wall (15) positioned between the fastened portion (31) of one bus bar (3) and the fastened portion (31) of the other bus bar (3).

[4]

A holding structure of a terminal-equipped electric wire includes: the connector (1) according to any one of [1] to [3]; and a terminal-equipped electric wire (8) in which a terminal fitting (42) is attached to an end of an electric wire (41), in which the electric wire (41) of the terminal-equipped electric wire (8) extends toward the connector (1) in a curved state, and the terminal fitting (42) is disposed in the gap (L) between the fastened portion (31) of the bus bar (3) and the nut (4), and in a state in which the bolt (50) is not fastened to the nut (4), is pressed against and brought into contact with at least one of the fastened portion (31) and the nut (4) by an elastic force generated by the curved electric wire (41), and is held in the gap (L) by a frictional force generated between the terminal fitting (42) and at least one of the fastened portion (31) and the nut (4).

[5]

The holding structure according to [4], in which the terminal fitting (42) is held in the gap (L) in a state in which a bolt through hole (43a) of the terminal fitting (42) is not positioned so as to be able to be fastened together with the fastened portion (31).

According to the connector having the configuration of [1], after the housing is assembled to the wall portion (for example, the outer wall) of the box-shaped body, for example, when the terminal fitting is connected to the fastened portion of the bus bar (that is, co-fastening by the bolt and the nut is performed) while the electric wire extending from the device or the like disposed inside the box-shaped body is curved, if the terminal fitting is inserted into the gap between the fastened portion and the nut, the terminal fitting can be pressed against the fastened portion or the nut by the elastic force generated by the electric wire, and the terminal fitting can be held in the gap. In other words, before the terminal fitting is fastened and fixed to the fastened portion, the terminal fitting can be temporarily fixed (temporarily placed) in the gap between the fastened portion and the nut. Accordingly, for example, when the terminal fitting is fastened and fixed, the operator can release his or her hand from the electric wire or the terminal fitting to prepare a bolt, a fastening tool, or the like. Therefore, it is not necessary for an operator to always press the terminal-equipped electric wire, and thus the work of fastening and fixing the terminal fitting becomes easy. Therefore, the connector of this configuration can improve the workability of the work of connecting the terminal-equipped electric wire to the connector.

According to the connector having the configuration of [2], the fastened portion of the bus bar is disposed so as to extend from the body portion of the bus bar in the direction intersecting the direction in which the body portion extends and cover the nut. Accordingly, the length (eventually, the length of the connector) of the bus bar in the direction is shorter as compared to the case in which the fastened portion extends in the same direction as the body portion, and therefore a work space inside the box-shaped body can be increased. Therefore, the connector of the present configuration can improve the workability of the work of connecting the terminal-equipped electric wire to the connector.

According to the connector having a configuration of [3], the insulation distance (in particular, the creepage distance) between the fastened portion of one bus bar and the fastened portion of the other bus bar can be improved by the partition wall of the housing. Accordingly, in particular, even when the liquid such as the lubricating oil is sealed inside the box-shaped body, such as the transmission, and the conductive fine particles (for example, so-called contamination such as abrasion powder of gears) are contained in the liquid, the unintended conduction between the bus bars can be prevented. Therefore, the reliability of the electrical connection by the connector can be improved.

According to the holding structure of the terminal-equipped electric wire having the configuration of [4], after the housing is assembled to the wall portion (for example, the outer wall) of the box-shaped body, for example, when the terminal fitting is connected to the fastened portion of the bus bar (that is, co-fastening by the bolt and the nut is performed) while the electric wire extending from the device or the like disposed inside the box-shaped body is curved, if the terminal fitting is inserted into the gap between the fastened portion and the nut, the terminal fitting can be pressed against the fastened portion or the nut by the elastic force generated by the electric wire, and the terminal fitting can be held in the gap. In other words, before the terminal fitting is fastened and fixed to the fastened portion, the terminal fitting can be temporarily fixed (temporarily placed) in the gap between the fastened portion and the nut. Accordingly, for example, when the terminal fitting is fastened and fixed, the operator can release his or her hand from the electric wire or the terminal fitting to prepare a bolt, a fastening tool, or the like. Therefore, it is not necessary for an operator to always press the terminal-equipped electric wire, and thus the work of fastening and fixing the terminal fitting becomes easy. Therefore, the holding structure of this configuration can improve the workability of the work of connecting the terminal-equipped electric wire to the connector.

According to the holding structure of the terminal-equipped electric wire having the configuration described in [5], the terminal fitting can be held in the gap between the fastened portion and the nut even when the fastened portion of the bus bar and the bolt through hole of the terminal fitting are not aligned with each other. Therefore, since strictly accurate positioning for the temporary placement of the terminal fitting is not required, a burden on the operator is reduced, and the workability of the work of connecting the terminal-equipped electric wire to the connector can be further improved.

According to the present invention, a connector and a holding structure of a terminal-equipped electric wire using the connector capable of improving workability of a work of connecting a terminal-equipped electric wire to the connector can be provided.

What is claimed is:

1. A holding structure of a terminal-equipped electric wire comprising:

a connector for use with a box-shaped body having a wall portion; and a terminal-equipped electric wire in which a terminal fitting is attached to an end of an electric wire, wherein the connector includes a housing configured to be assembled to the wall portion of the box-shaped body that is an attachment target;

a bus bar that connected to the housing, and including a body portion and a fastened portion, the body portion is configured to penetrate the wall portion when the housing is assembled to the wall portion, the fastened portion extends from the body portion, the fastened portion is configured to be disposed on an inner side of the box-shaped body with respect to the wall portion when the housing is assembled to the wall portion, and the fastened portion is configured to be connected to a terminal fitting by fastening using a bolt; and a nut that is mounted on the housing with a gap between the nut and the fastened portion, the gap is configured to receive the terminal fitting when the terminal fitting is fastened to the fastened portion, and configured to engage with the bolt when the bolt fastens the fastened portion and the terminal fitting inserted into the gap together, the electric wire of the terminal-equipped electric wire extends toward the connector in a curved state, and the terminal fitting is disposed in the gap between the fastened portion of the bus bar and the nut, and in a state in which the bolt is not fastened to the nut, the terminal fitting is pressed against and brought into contact with at least one of the fastened portion and the nut by an elastic force generated by the curved electric wire, and is held in the gap by a frictional force generated between the terminal fitting and the at least one of the fastened portion and the nut.

2. The connector according to claim 1, wherein
the fastened portion of the bus bar extends from the body portion in a direction intersecting an extending direction of the body portion and is disposed so as to cover the nut.

3. The connector comprising the connector according to claim 1, wherein
a plurality of the bus bars are provided, and
the housing includes a partition wall positioned between the fastened portion of one bus bar and the fastened portion of the other bus bar.

4. The holding structure of terminal-equipped electric wire according to claim 1, wherein
the terminal fitting is held in the gap in a state in which a bolt through hole of the terminal fitting is not positioned so as to be able to be fastened together with the fastened portion.

5. The connector according to claim 1, wherein
the nut is non-rotatable with respect to the housing.

* * * * *